June 9, 1942.  J. L. FINCH  2,285,504
RECTIFIER TEMPERATURE CONTROL
Filed Oct. 31, 1939  4 Sheets-Sheet 1

INVENTOR.
JAMES L. FINCH
BY
ATTORNEY.

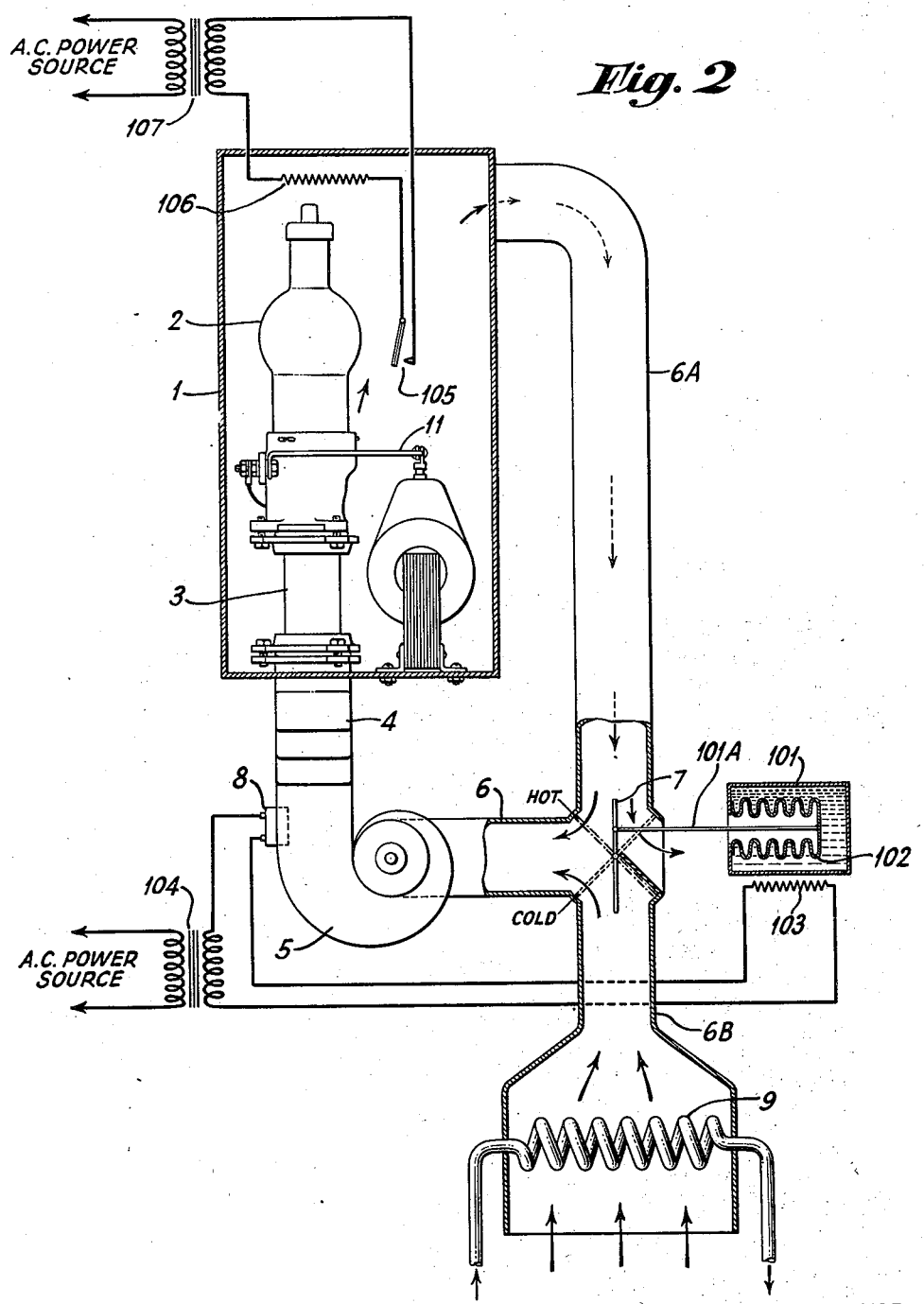

June 9, 1942.  J. L. FINCH  2,285,504
RECTIFIER TEMPERATURE CONTROL
Filed Oct. 31, 1939  4 Sheets-Sheet 3
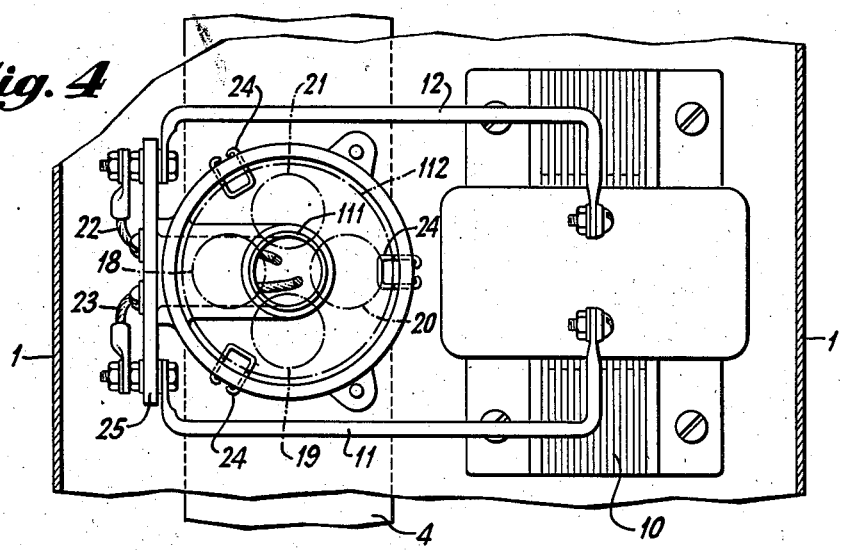
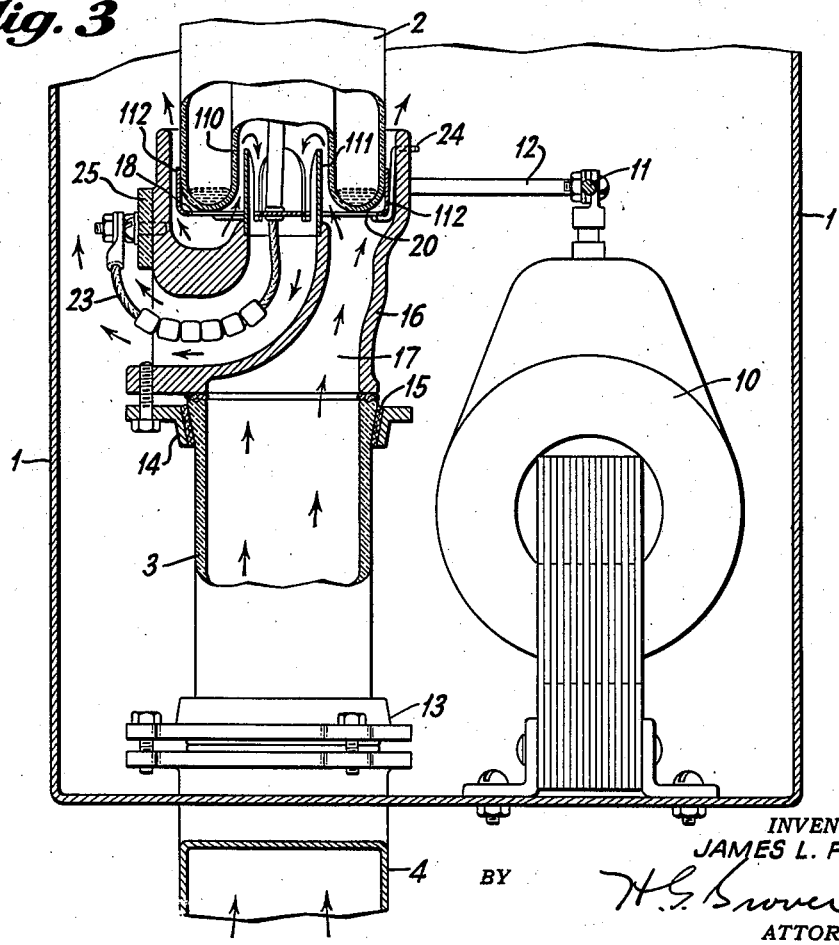
INVENTOR.
JAMES L. FINCH
BY
ATTORNEY.

June 9, 1942.  J. L. FINCH  2,285,504
RECTIFIER TEMPERATURE CONTROL
Filed Oct. 31, 1939   4 Sheets-Sheet 4
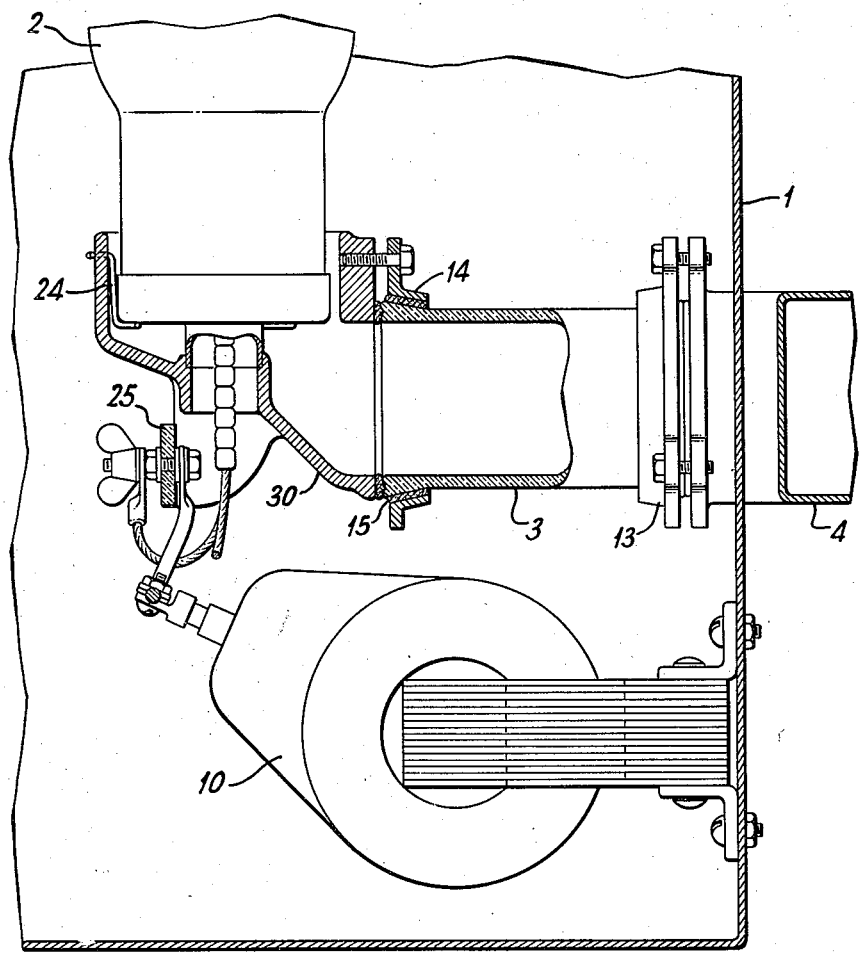
INVENTOR.
JAMES L. FINCH
BY
ATTORNEY.

Patented June 9, 1942

2,285,504

UNITED STATES PATENT OFFICE 2,285,504

RECTIFIER TEMPERATURE CONTROL

James L. Finch, Patchogue, N. Y., assignor to Radio Corporation of America, a corporation of Delaware Application October 31, 1939, Serial No. 302,096

10 Claims. (Cl. 250—27.5)

This invention relates to a new and useful method of mercury vapor rectifier temperature control as applied to a rectifier for a radio transmitter.

An object of this invention is to provide an improved rectifier temperature control system.

Another object is to arrange the temperature control system so that a portion of the fluid conductor also acts as a high voltage support insulator for the rectifier tube.

Still another object of this invention is to provide a novel arrangement of the various rectifier units with the rectifier tubes.

A feature of the invention is the means wherein either heating or cooling fluid is circulated through the tube high voltage support insulator and thence around the lower portion of the tube socket.

Rectifier temperature control systems of prior art generally employed high voltage support insulators that were separate and apart from the temperature control system. By my invention, the high voltage support insulator for the rectifiers are combined with the tube, thus insuring a compact and highly efficient rectifier system.

The invention will best be understood by referring to the accompanying drawings, in which:

Fig. 2 is a cross sectional view of Fig. 1;

Fig. 3 is an enlarged sectional detail of Fig. 1, showing a single tube fluid duct and support;

Fig. 4 is a plan view of Fig. 3;

Fig. 5 is a perspective detail of a tube centering clip; and

Fig. 6 is a modification of Figs. 3 and 4, wherein the fluid duct is arranged in a horizontal position instead of a vertical, as shown by Figs. 1 to 4. inclusive.

Figure 1:
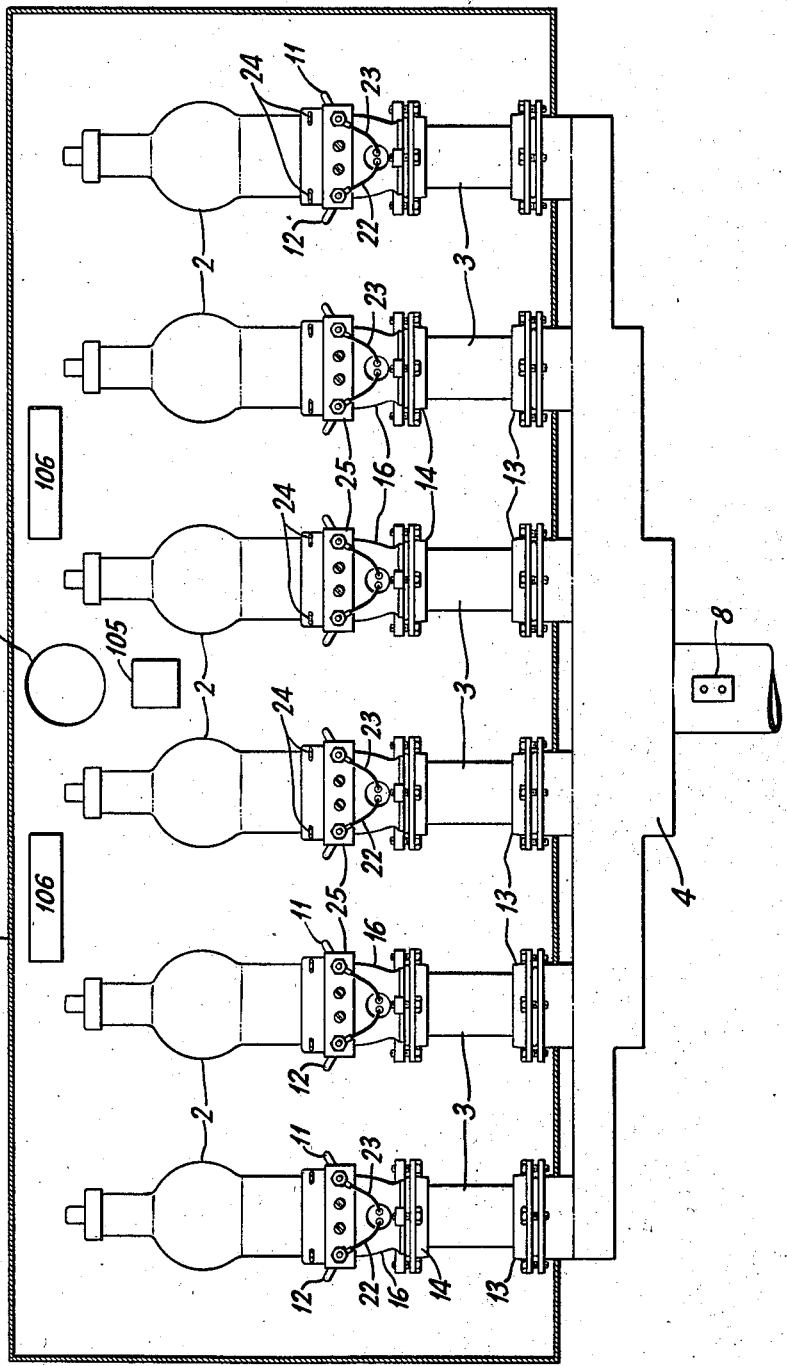
Fig. 1 is a longitudinal section of the rectifier temperature control system.

Referring now in detail to the drawings, a solid enclosure member 1 has contained therein a plurality of mercury vapor rectifier tubes 2 of the RCA857 type. Each tube is spaced apart from another by a sufficient amount to provide ample air circulation and supported by a long insulating tube, such as for example, a "Pyrex" glass tube 3 having substantial wall thickness. The "Pyrex" insulators or the tube ducts are each supported upon the top portion of an air duct 4, which has blower 5 placed near the middle of the row of rectifier tubes. The air duct 4 from blower 5 is divided into two branches, each branch supplying cooling air to three tubes. The cross-sectional area of the duct is reduced at a position near each tube by an amount that the air velocity will remain substantially constant. The size of the duct is preferably made such that the velocity of the air in the duct will be essentially the same as that in the "Pyrex" insulator.

The intake 6 to the blower is arranged with a damper 7 so that either heated air can be drawn from the top of the tube enclosure near the middle or from the cool air supply or that a suitable mixture of the air from these two sources be supplied. The position of this damper will be automatically adjusted by means of a motor control and a thermostat 8, the latter located in the output from the blower so as to maintain a constant temperature.

A pipe coil 9 is provided at the front portion of blower 5 to supply cooling fluid thereto.

A transformer 10 connects to the cathode leads of tube 2 by means of leads 11 and 12.

It is preferable that vents be arranged in the top of the tube compartment 1 which will be controlled by the same mechanism as that which controls the damper 7. Thus, when the damper calls for less air from the tube compartment, these vents should be opened wider and allow the warm air to discharge out of the top.

There may be provided two general arrangements by means of which the thermostat can control the position of the damper 7. One would be to provide a set of front and back contacts for the thermostat 8 which are connected to the damper mechanism, such that when the thermostat calls for greater ventilation and the motor turns the damper to give this greater ventilation, the motion of this damper will tend to break the thermostat circuit and vice versa. The other method is to simply arrange for the thermostat to run the motor control in one direction when the temperature is below normal and in the opposite direction when the temperature is above normal, but to make some provision for slowing down the response of the damper 7 so that it will not move faster than the temperature in the system can follow. If this were not done, hunting would result. This can either be done by means of a very high ratio of gears or by introducing a "light blinker" device which will keep the motor circuit open except for a relatively small percentage of the time.

The latter method would be cheaper to build but it has the disadvantage that it cannot give a quick change in the air circulation when such a change is desirable.

Referring in detail to Fig. 2, it will be seen that damper 7 is placed near the intake to blower 5, and a duct 6A connects between the outlet from compartment 1 and the damper. A second duct 6B directs cooling fluid from the coil 9 to the damper 7. With the damper in an intermediate position, as shown by Fig. 2, part of the air is re-circulated through the compartment, while another part of the air is discharged outside the system to the room and is replaced by new air brought in past cooler 9. The dotted lines indicate one extreme position of the damper 7, and is marked "Cold." When the damper is in the "Cold" position, all of the air is re-circulated. The other extreme position is indicated by the dot and dash line marked "Hot." Under this condition, all the air is drawn in past the outside cooler and discharged from the compartment to the air, none of which is re-circulated. As shown by the drawings, damper 7 is controlled by a vapor motor 101, which consists of a cup-like device into which is tightly secured a bellows 102. The space between the cup and the bellows is partly filled with a volatile liquid. An alternating current power source supplies power through transformer 104 to a heater 103, which is associated with the vapor motor 101. Power is supplied only when the thermostat switch 8 closes the circuit. When the air passing through thermostat 8 is hotter than the temperature desired, it closes. This causes heat to be liberated from heater 103, which in turn tends to boil the liquid in motor 101. This builds up a pressure which slowly moves the link 101A connecting motor 101 to damper 7 toward the left. This causes cool air to be brought in and less of the air to be re-circulated, thus lowering the temperature of the air passing thermostat 8 and causing it to open. The vapor in device 101 now begins to condense and link 101A moves slowly toward the right. Then, more of the air is re-circulated and less is drawn in past the cooler, so that the air passing thermostat 8 now becomes warmer, causing it to close and the cycle to be repeated. This results in the air entering compartment 1 to be maintained within very close limits.

When additional heat is required, the heater 106 or heaters should be placed in the upper portion of the tube compartment 1 and arranged so that they cannot heat the tubes directly but only by heating the air which is drawn out of the compartment through the blower and back to the bases of the tubes.

An alternating current power source supplies power through transformer 107 to heater 106, when the thermostat switch 105 is closed. Switch 105 closes when the temperature of the air in the compartment is below the desired predetermined temperature and opens when it is above the desired temperature. Switch 105 must be set so that the temperature at which it closes it somewhat higher than the temperature at which thermostat switch 8 closes.

Referring now to Figs. 3, and 4, wherein a more detailed showing of the construction is given, the "Pyrex" tube 3 is shown supported to duct 4 by a flanged ring 13. A similar ring 14 is secured to the upper portion of tube 3 by suitable cement 15 surrounding the thickened end portion of the tube. A casting 16 is bolted to the upper flange ring 14 and is provided with an air channel 17. The central portion of member 16 has an elbow-like central bore for the flexible cathode leads 22 and 23 of tube 2. An insulating strip 25 supports the transformer leads 11 and 12 at a point where they are connected to the cathode leads.

Three spring wire clips 24 are bent as shown in detail by Fig. 5 to pass through a pair of holes in castings 16 to serve as clamping and support means for the rectifier tube. This arrangement leaves a space around the base of tube 2 which permits cooling air rising through 3 to escape through the space, as shown by the arrows. It is also desirable to cool the filament leads 22 and 23 and the re-entrant glass 110 of tube 2 into which the filament leads are sealed. The base of tube 2 is normally fitted with a metal cap 112 in which is provided holes 18, 19, 20 and 21. The filament leads pass through small holes in the center of cap 112, one lead being connected to it and another being insulated therefrom. A short cylinder 111 is inserted into the re-entrant part of tube 2 and around the filament leads. Four slots are cut in member 111 to allow the remainder of the cylinder to pass through holes 18, 19, 20 and 21. The lower end of 111 fits into the upper end of the elbow-like central bore in casting 16. Air rising through insulating tube 3 passes up through apertures 18, 19, 20 and 21 outside of 111 and into space 110 and then returns inside of member 111 down through the elbow-like central bore, as indicated by the arrows, thus cooling the tube seals and filament leads. It will be seen by this arrangement that the cooling fluid completely surrounds the base portion of the rectifier tube, at which portion the mercury within the tube is located.

Fig. 6 indicates an arrangement in which tube 2 is supported by a horizontal insulator duct of the same general construction as that described in connection with Figs. 3 and 4, except that the casting 16 is substituted by a slightly different shaped member 30. The cathode leads from the tube are carried out through a straight tube in the center of casting 30.

Although only two embodiments of this invention are disclosed herein, it should be distinctly understood that this invention should not be limited precisely thereto.

What is claimed is:

1. A temperature control system for an electron discharge device subjected to high voltages with respect to ground in the normal operation thereof comprising the combination of a casing for enclosing said electron discharge device, means for circulating a cooling fluid through said casing, a tubular insulating member supporting said electron discharge device within said casing and serving as a means for directing said cooling fluid on said electron discharge device.

2. In a cooling system for an electron discharge device subjected to high voltages with respect to ground in the normal operation thereof, an electron discharge device, a device for supplying cooling fluid to said electron discharge device, including a hollow insulating member having a substantially heavy wall serving as a cooling fluid duct and the sole support for insulating said electron discharge device from ground, and a fluid channel member interposed between said hollow insulating member and said electron discharge device, said fluid channel member having divided sections, one of said sections being adapted to provide a channel for the electrical leads of said electron discharge device.

3. In a cooling system for an electron discharge device subjected to high voltages with respect to ground in the normal operation thereof, an electron discharge device, a device for supply cooling fluid to said electron discharge device, a closed casing for circulating the cooling fluid from said device to and around said electron discharge device, a hollow insulating member having a substantially heavy wall serving as a fluid duct and the sole support for insulating said electron discharge device from ground, a flange-like ring secured to each end of said hollow insulating member, one of said flange-like rings secured to said closed casing, the other flange-like ring secured to a socket member for said electron discharge device.

4. In a cooling system for an electron discharge device subjected to high voltages with respect to ground in the normal operation thereof, an electron discharge device, a fluid circulating device for supplying a cooling fluid to said electron discharge device, a casing for enclosing said electron discharge device and for circulating the cooling fluid from said fluid circulating device around the electron discharge device, a fluid duct divided outside of said casing into two branches forming inlet and outlet passages which are connected to said casing, a temperature controlled damper interposed between said inlet and outlet passages, a hollow insulating member within said casing and connected to said inlet passage of said fluid duct to serve as a channel for said cooling fluid and to insulatingly support said electron discharge device from ground.

5. In a cooling system for an electron discharge device which is subjected to high voltages with respect to ground in the normal operation thereof, an electron discharge device, a fluid circulating device for supplying a cooling fluid to said electron discharge device, a casing for enclosing said electron discharge device, a fluid duct secured to said casing, means for vertically arranging said electron discharge device within said casing including an insulating member located in a plane at right angles to the plane of said electron discharge device to serve as a channel for said cooling fluid and to insulatingly support said electron discharge device from ground.

6. In a cooling system for an electron discharge device subjected to high voltages with respect to ground in the normal operation thereof, an electron discharge device, a fluid circulating device for supplying a cooling fluid to said electron discharge device, a casing for enclosing said electron discharge device and for circulating the cooling fluid from said fluid circulating device around the electron discharge device, a fluid duct divided outside of said casing into two branches forming inlet and outlet passages which are connected to said casing, a temperature controlled damper interposed between said inlet and outlet passages, a hollow insulating member within said casing and connected to said inlet passage of said fluid duct to serve as a channel for said cooling fluid and to insulatingly support said electron discharge device from ground, and a fluid channel member interposed between said hollow insulating member and said electron discharge device, said fluid channel member having divided sections, one of said sections being adapted to provide a channel for the electrical leads of said electron discharge device.

7. In a cooling system for a plurality of electron discharge devices which are subjected to high voltages with respect to ground in the normal operation thereof, a plurality of electron discharge devices, a device for supplying a cooling fluid to said electron discharge devices, a casing for enclosing said devices, a fluid duct secured to said casing, means for supplying cooling fluid through said duct to said devices including a plurality of hollow insulating members within said casing and located above apertures in the casing and adjacent said duct, which form a separate fluid channel for each device and serving also to support and insulate each device from ground, and means within said casing to control the temperature of said system.

8. In a cooling system for a plurality of electron discharge devices which are subjected to high voltages with respect to ground in the normal operation thereof, a plurality of electron discharge devices, a combination of fluid devices for supplying heating and cooling fluid to said electron discharge devices, a casing for enclosing said devices, means for supplying the heating and cooling fluid to said electron discharge devices including a plurality of insulating hollow members which form a separate channel for each device and serving also to insulate each electron discharge device from ground, and means within said casing to control the temperature of said system, said means including hot and cold fluid ducts outside of said casing, a thermostat, a vapor motor controlled by said thermostat, a damper located within said ducts outside of said casing, and a link member connecting said motor to said damper, the position of said damper being controlled by said thermostat to allow the flow of either hot or cold fluid in said casing.

9. In a cooling system for an electron discharge device subjected to high voltages with respect to ground and heating in the normal operation thereof, an electron discharge device, a device for supplying cooling fluid to said electron discharge device, a closed casing of a radio transmitter for circulating the cooling fluid from said device to and around said electron discharge device, a metal shell located at the base of said electron discharge device, a hollow insulating member having a greater length than said shell, and a substantially heavy wall serving as a fluid duct and the sole support for insulating said electron discharge device from ground, a flange-like ring secured to each end of said insulating member, one of said flange-like rings secured to said closed casing of the radio transmitter, the other flange-like ring secured to said metal shell which is located at the base of said electron discharge device.

10. In a cooling system for a plurality of electron discharge devices which are subjected to high voltages with respect to ground and heating in the normal operation thereof, a plurality of electron discharge devices, a metal shell located at the base of each one of said electron discharge devices, a device for supplying a cooling fluid to said electron discharge devices, a casing for enclosing said electron discharge devices, a fluid duct secured to said casing, means for supplying cooling fluid through said duct and to said devices, including a plurality of hollow insulating support members having a greater length than said shell and forming a fluid channel for said cooling fluid, said hollow insulating support members located above apertures in said casing adjacent said duct and in fluid communication therewith and serving also to support and insulate each device from ground.

JAMES L. FINCH.